United States Patent [19]

Glatzel

[11] Patent Number: 4,974,985
[45] Date of Patent: Dec. 4, 1990

[54] BALL JOINT

[75] Inventor: Michael Glatzel, Düsseldorf, Fed. Rep. of Germany

[73] Assignee: TRW Ehrenreich GmbH & Co. KG, Fed. Rep. of Germany

[21] Appl. No.: 358,470

[22] Filed: May 30, 1989

Related U.S. Application Data

[63] Continuation of Ser. No. 148,963, Jan. 27, 1988, abandoned.

[30] Foreign Application Priority Data

Jan. 27, 1987 [DE] Fed. Rep. of Germany ....... 3702277

[51] Int. Cl.⁵ ............................................. F16C 11/08
[52] U.S. Cl. .................................... 403/114; 403/124; 403/133
[58] Field of Search ............... 403/133, 124, 126, 128, 403/132, 135, 138, 143, 140, 114, 115, 125, 122, 127

[56] References Cited

U.S. PATENT DOCUMENTS

| 2,516,688 | 7/1950 | Flumerfelt | 403/125 |
| 2,544,584 | 3/1951 | Booth | 403/127 |
| 2,838,330 | 6/1958 | Fidler | 403/126 |
| 3,072,426 | 1/1963 | Gilbert | 403/115 |
| 3,667,789 | 6/1972 | McNeely et al. | 403/128 |
| 4,332,500 | 6/1982 | Smith, Jr. et al. | 403/114 |
| 4,615,638 | 10/1986 | Ito | 403/133 X |
| 4,750,885 | 6/1988 | Ito | 403/133 X |

FOREIGN PATENT DOCUMENTS

| 212028 | 1/1958 | Australia | 403/127 |
| 3000764 | 9/1980 | Fed. Rep. of Germany | |
| 167498 | 6/1959 | Sweden | 403/138 |
| 2066893 | 7/1981 | United Kingdom | 403/124 |

Primary Examiner—Peter M. Cuomo
Attorney, Agent, or Firm—Tarolli, Sundheim & Covell

[57] ABSTRACT

A ball joint for use in motor vehicles and comprising a one-piece ball head (4) having a simplified construction, an increased bearing surface, and including a ball portion (11) of a smaller radius adjacent to the shank (5), an inner ball portion (10) of a greater radius both having the same center, and an annular shoulder (14) formed between the two ball portions (10, 11) and cooperating with an outer bearing shell half (3) for the smaller ball portion (11) which acts as a stop.

3 Claims, 1 Drawing Sheet

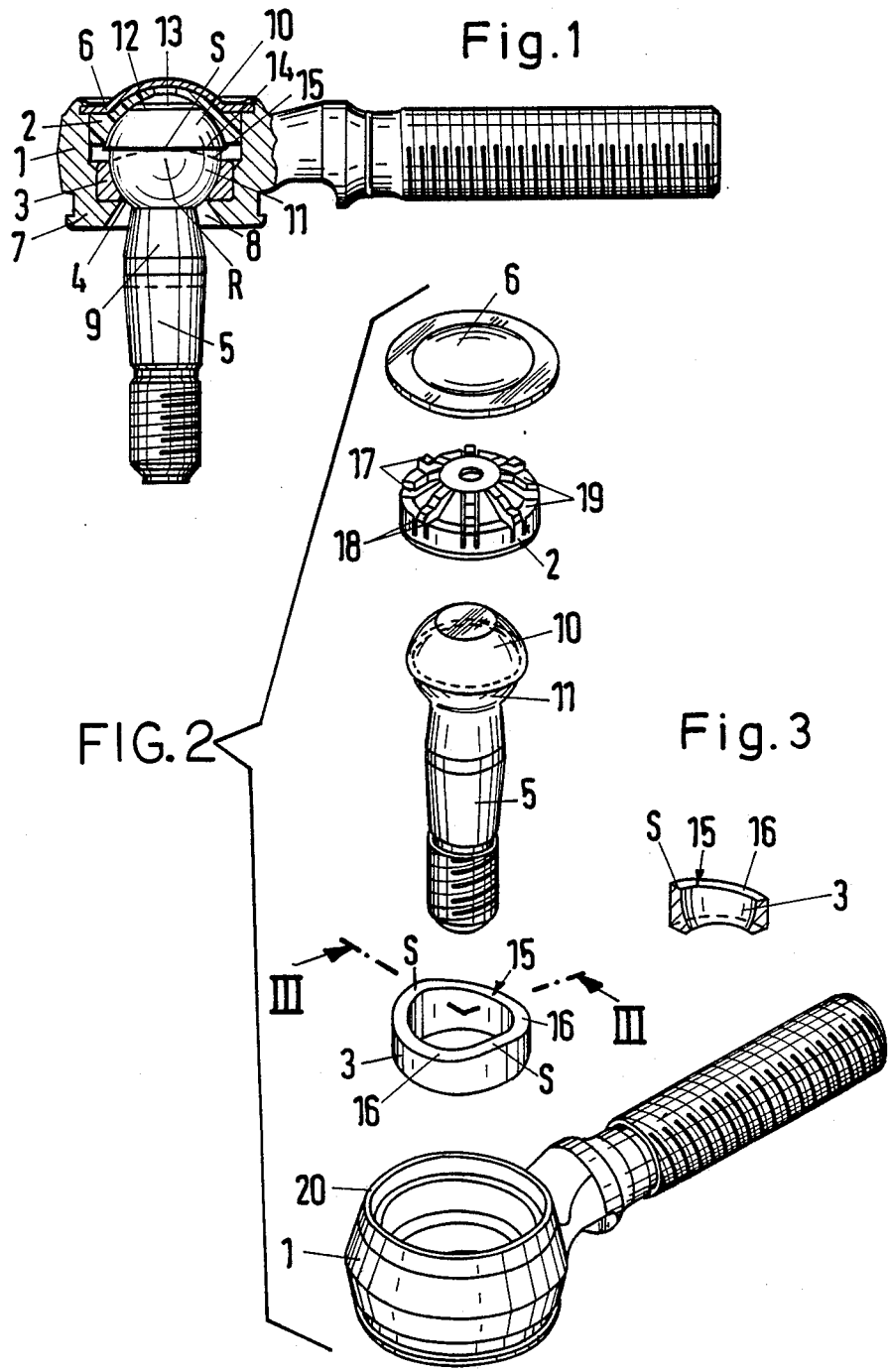

BALL JOINT

RELATED APPLICATIONS

This is a continuation of my co-pending application Ser. No. 148,693, filed Jan. 27, 1988, now abandoned.

DESCRIPTION

The invention relates to a ball joint for use in motor vehicles and comprising a bearing shell located in a joint housing for rotatably supporting a ball stud pivotable between stops on an inner half of the bearing shell.

In many cases, ball joints in motor vehicles are subjected to the danger of the neck of a ball shank striking against the rim of an opening in the joint housing through which the shank extends. This may damage or destroy the joint housing. For example, in hydraulically operated power steering systems, longitudinal axes of a work cylinder and a tie rod usually do not extend in one plane. Consequently, upon actuation of the work cylinder, an additional torsional moment acts on the tie rod and, thus, causes twisting of the ball joint housing in relation to the ball stud. The ball joint housing is located at an end of the tie rod and is connected with a steering lever. As a result of the twisting, the edge of the opening through which the shank extends can strike against the neck of the shank. Thus, the joint housing which is made of ductile or brittle metal material can be damaged or destroyed.

To solve the above-mentioned problem, German Laid-Open Application No. 3,000,764 discloses a ball joint for use in a tie rod and comprising a rotatable ball stud having a ball head formed of several parts, and supported for pivotal movement only around an axis perpendicular to the tie rod axis. The ball head comprises a semi-spherical segment for receiving a ball member. A bearing half has a semispherical recess for receiving the ball member. The free inner ends of the bearing half are stops cooperating with an annular end surface of the semi-spherical segment that forms a part of the ball stud. In this known ball joint, with the ball head formed of several parts, the parts of the ball head must be centered relative to each other along a single axis. Also, this known ball joint has relatively small bearing surface so that in use high surface pressures result. Accordingly, the object of the invention is an improved ball joint in which deflection is limited.

The object of the invention is achieved by providing a ball joint comprising a one-piece ball head, having an outer ball portion of a smaller radius adjacent the shank portion of the ball stud, and an inner ball portion of a greater radius, the two radii having the same center. The ball portion of the greater radius is supported in an inner bearing shell half. An annular shoulder is formed between the two ball portions and cooperates with an outer bearing shell half which supports the smaller diameter ball portion to limit pivotal movement of the ball stud relative to the joint housing.

In a ball joint designed according to the teachings of the subject invention, the ball head is made in one part. Consequently, the ball joint according to the invention has the advantage of a simplified construction as compared with the state of the art. The ability of the mushroom-shaped ball head to rotate or pivot, is insured by the fact that the different radii of the ball sections have a common center. The shoulder formed between the ball portions can pivot between the bearing shell halves, while the ability of the end of the bearing shell half receiving the ball portion of a smaller radius to pivot is limited. The ability of the ball stud to pivot is determined by the distance between the shoulder of the ball head in the middle position of the ball stud and the end of the outer bearing shell half for the smaller ball portion. This distance may vary along the circumference of the bearing shell half which limits movement of the ball stud relative to the joint housing so that in accordance with the direction of pivoting of the ball stud, different maximum angles of deflection result. This may be attained, for example, by providing a transitional surface between a flat end surface of the bearing shell half serving as stop for the ball stud and a profiled end surface. However, care must be taken to secure this bearing shell half in the joint housing against rotation.

A ball joint designed according to the invention also has the advantage, as compared with the prior art, of relatively large bearing and stop surfaces, so that the surface pressures to which the material of the bearing shell is subjected, are reasonable. When the ball stud engages the stops, shocks are resiliently absorbed by the outer bearing shell half, because it is made of resilient synthetic material, for example, polyurethane or polyoxymethylene. Finally, an adequate supply of lubricant to bearing surfaces between the ball head shoulder and the outer bearing shell half is also assured, especially when the ball stud rotates with the ball head shoulder engaging the stops on the outer bearing shell half because the inner end surface of the outer bearing shell half extends in the equatorial region of the bearing area of the ball head.

In one embodiment of the invention, it is also possible to design the end surface of the outer bearing shell half forming the stops so that the ball stud can pivot in only one plane. To this end, in this one embodiment of the invention, the shoulder of the ball head engages the end surface of the outer bearing shell half forming the stops in two contact zones displaced by 180°, and that the end surface in a contact zone has a radius of curvature around the pivot axis of the ball stud, which is equal to the distance of the pivot axis from the shoulder.

In this embodiment, the pivot plane of the ball stud extends perpendicular to the line of connection of the contact zones which are displaced by 180° and define the stops engageable by the shoulder of the ball head. Thus, the shoulder on the ball stud, upon pivoting of the ball head around the pivot axis, rolls along the contact zones. The distance between the pivot axis and the shoulder does not vary when the ball stud pivots around its pivot axis, and the shoulder pivots in one plane and in contact with an end surface of the outer bearing half which has a radius of curvature corresponding to this distance. The pivotable movement of the ball stud is limited by existing stop zones on the end surface of the bearing shell half with the contact zones, which stop zones do not have the foregoing radius of curvature.

In another embodiment, the curved contact zones of the end surface of the bearing shell half forming the stops extend into tangentially connected thereto stop planes. In this way, it is assured that the shoulder and stops engage along a large surface area so that the distribution of forces in the bearing shell halves is favorable, and local tension peaks are prevented.

In another embodiment, at least one bearing shell half, in the axial direction of the stud, is supported against the joint housing by one or more springs. The spring is prestressed during the assembly of the ball joint and can compensate production tolerances of the parts of the ball joint, and wear, especially when the wear results from wear of the bearing surfaces. Moreover, one or more springs contribute to the resilient absorption of shocks resulting from engagement of the shoulder with a stop since, with a slight change of position of the spring-supported bearing shell half, a further movement of the ball stud against the spring force is made possible. The spring may be a coil spring, for example, supported between a cover or bottom of the housing and the bearing shell half adjacent to the cover or bottom of the housing.

The springs may also be formed by elevations supported against the housing cover or bottom and which extend radially on the bearing shell half adjacent to the housing cover or bottom. Therefore, there is no need for an additional spring. The bearing shell half provided with elevations is preferably made of a soft elastic synthetic material, especially polyurethane.

In another embodiment, the elevations of the bearing shell half which is adjacent to the housing cover or bottom, are separated by radially extending slots from rigid stops. In this way, an overload of the elevations by axial compression is prevented. The side deformation of the elevations is limited by limiting walls of the slots as a result of a gradually increasing spring force. When the elevations are completely deformed into the slots, the rigid stops contact the cover or the bottom surface and stop further deformation of the elevations so that these cannot be damaged.

Other details and advantages of the invention would become clear from the description which follows with reference to the respective drawings, in which a ball joint according to the invention is shown.

FIG. 1 is a front view of a ball joint with the joint housing partially cut away;

FIG. 2 is an exploded view of the same ball joint;

FIG. 3 is a partial cross-section view of an outer bearing shell half of the same ball joint along line III—III of FIG. 2.

FIG. 1 shows a ball joint comprising a joint housing 1, a bearing shell located in the housing and comprising an inner bearing shell half 2 and an outer bearing shell half 3, and a ball stud 5 having a ball head 4 supported in the bearing shell halves 2, 3. The inner bearing shell half 2 is supported against a rolled-in housing cover 6 and the outer bearing shell half 3 is supported against a circumferential inner step 7 at the ball stud side of the housing. The inner step 7 forms, at the same time, the rim of an opening 8 through which the ball stud 5 extends. The conical ball stud neck 9 is prevented from striking against the rim.

The ball head 4 has an inner ball portion 10 with a greater radius, and an outer ball portion 11 with a smaller radius. The ball portions 10 and 11 are supported in the cup-shaped bearing shell halves 2, 3 having corresponding inner radii. The inner ball portion 10 has a pole cup 12 for the purpose of increasing the functional efficiency of the ball joint. Above the pole cup 12 is arranged, in the inner bearing shell half 2, a grease reservoir 13 having a filling opening. The ball portions 10 and 11 have a common center R around which the ball head 4 can rotate within the bearing shell halves 2, 3.

A circumferential shoulder 14 is formed between the ball portions 10 and 11. The ability of the ball stud 5 to pivot is limited due to abutting of the shoulder 14 against an end surface 15 of the adjacent outer bearing shell half 3. At the apex S of the end surface 15, the shoulder engages the end surface 15. The end surface 15 defines, displaced by 180°, symmetrically formed contact zone for the shoulder 14 with apexes S.

The contact zones of the end surface 15 engaged by the shoulder 14 are curved around respective apexes S, so that the shoulder 14 in its pivotal movement rolls along the contact zones around a pivotal axis extending perpendicular to the plane of the drawing through the radius center point R. To this end, the contact zones have a radius of curvature which is equal to the distance between the pivotal axis through the midpoint R and the shoulder 14 (distance R-S). In this way, it is assured that the ball stud 5 pivots exclusively in the plane of the drawing. It is also assured that the ball stud 5, in any pivotal position can rotate around its own axis.

The contact zones of the end surface 15 have on opposite sides of the curved contact zones stop surfaces which limit the pivot angle of the ball stud 5 and which are engaged by the shoulder 14. In the shown embodiment, the curved contact zones are small and are not very clearly shown in the drawing because the maximum pivot angle of the ball stud 5 is also small.

Further explanation of further details of the ball joint and its structure will be given with reference to FIGS. 2 and 3. First, the outer bearing shell half 3 is pressed into the joint housing 1, so that it is held under a preload. As can be seen in FIGS. 2 and 3, the end surface 15 comprises contact zones with apexes S, a radius of curvature and stop surfaces 16.

A ball stud 5 has an outer ball portion 11 received in the bearing shell half 3 and an inner ball portion 10 received in the inner bearing shell half 2. The inner bearing shell half 2 has radially extending rib-shaped elevations 17 on the outer side adjacent the housing cover 6. The elevations 17 when the ball joint is completely assembled, lie against the housing cover 6. The elevations 17 are separated by slots 18, also extending radially from rigid stops 19. Finally, the housing cover 6 engages the inner bearing shell half 2 and is fastened by the rolling-in of a housing rim 20. Upon rollin-in of the rim, the elevations 17 are compressed to a certain degree and become elastically preloaded. The maximum deformation of the inner bearing shell half 2, made of an elastic synthetic material, is reached when the stops 19 engage the inner surface of the housing cover 6.

I claim:

1. A ball joint comprising:

a housing having a shank opening;

a unitary ball stud having an axis and including a ball head received in said housing and a shank extending axially from said ball head through said shank opening;

said ball head including an inner ball portion having an arcuate outer surface with a first radius of curvature and an outer ball portion disposed along said axis between said inner ball portion and said shank portion, said inner ball portion having a planar pole surface defining an axial end of said ball stud remote from said shank, said outer ball portion having an arcuate outer surface with a second radius of curvature less than said first radius of curvature, said arcuate outer surfaces having a common center point, said inner and outer ball portions forming an annular planar shoulder therebetween;

a bearing shell supporting said ball head for rotation and pivotal movement in said housing, said bearing shell comprising an inner bearing shell half supporting said inner ball portion and an outer bearing shell half supporting said outer ball portion, said inner bearing shell half extending axially and radially over said pole surface to define a grease reservoir space theretween; and said outer bearing shell half including an axial end surface for engaging said annular shoulder on said ball head to permit pivotal movement of said ball head in only one plane and to limit pivotal movement of said ball head in said one plane, said annular shoulder on said ball head engaging said axial end surface on said outer bearing shell half at two contact zones on said axial end surface which are displaced by 180 degrees, said axial end surface permitting pivotal movement of said ball head about a pivot axis, said annular shoulder being spaced axially from said pivot axis, said axial end surface having in said contact zones a radius of curvature about said pivot axis which is equal to the axial distance between said pivot axis and said annular shoulder.

2. A ball joint as defined in claim 1 wherein said common center point of said arcuate outer surfaces on said ball head is in a plane spaced axially from the plane of said shoulder on said ball head, said point being on the pivot axis of said stud.

3. A ball joint as defined in claim 1 wherein said inner bearing shell half includes elastic means for resiliently limiting movement of said bearing shell relative to said housing.

* * * * *